3,147,114
LEAD BASE SOLDER ALLOY
Carl H. Hack, Princeton Junction, and Elbert J. Minarcik, Hightstown, N.J., assignors to National Lead Company, New York, N.Y., a corporation of New Jersey
No Drawing. Filed Dec. 7, 1962, Ser. No. 242,909
2 Claims. (Cl. 75—166)

This invention relates to lead solders. More particularly, the invention pertains to a novel creep resistant lead base solder alloy.

The manufacture of modern cans is a highly mechanized process and includes a soldering operation which is integrated into a fast moving production line. In one currently employed automatic process, preshaped can bodies, such as those made from tin plate and having a loose seam formed by hooking the ends of the cylindrical can stock together, are first fluxed and heated and then rapidly moved past a rotating roller or drum. The roller, always being partially immersed in a bath of molten solder, conveys to the can seams or joints a thin film of solder which thereafter solidifies and permanently seals and unites the seams. In such operations it is essential that the solder conveying roller be continuously wetted by the solder, i.e., that the roller remain clean and smooth to enable it to pick up and hold the solder.

It has been determined that various conventional alloying elements, such as aluminum, nickel, zinc, cobalt, arsenic, cadmium, sulfur and antimony, cause dewetting of the tinned solder conveying roller thereby impairing the transfer of a uniform layer of solder to the can body seam, resulting in defective soldered cans. For these elements to cause roller dewetting, they need only be present in a solder in small amounts. For example, arsenic in amounts greater than about 0.025%, aluminum in amounts greater than about 0.005%, sulfur in amounts more than 0.0008%, nickel together with cobalt in amounts over 0.015%, etc., are all productive of this deleterious operating condition.

Furthermore, antimony is undesirable due to its propensity to form with copper intermetallic compounds. These compounds are relatively insoluble in a solder bath and would create further processing difficulties.

It has also been established that even if a conventional solder should, at least initially, effectively solder can seams thereby alleviating the process difficulties, necessary solder product characteristics are found wanting particularly where the cans are to be ultimately internally pressurized. This is true not only where cans are soldered according to a procedure such as detailed above but with any type of soldering operation using conventionally formulated solders in any form or shape; wires, ingots, and the like.

The characteristic lacking in most solder alloys is the ability to remain in a static state and not elongate or creep under low stresses. Obviously, this problem becomes especially acute in aerosol or pressurized can bodies.

The solders used for aerosol cans have been lead base solders usually containing tin as the major alloying ingredient. Such tin-lead solders containing tin in amounts greater than about 19% have varying proportions of an eutectic-association between these two components, which association or eutectic structure substantially contributes to the solder's tendency to creep. In solders where the tin content is relatively low, for example about 2%, this deleterious tendency to elongate is somewhat reduced, but still not to be a preferred ploint. While numerous attempts have been made to modify these low tin-lead base solders by the addition of various alloying ingredients, only slight improvements in elongation or creep resistance have been achieved, generally at a sacrifice of other necessary solder properties. Where, for example, 0.5% antimony was incorporated into a low tin solder, the solder failed to be effective due to low creep resistance. The use of bismuth in such solders produced "hot shortness" (heat tear) and lowered the creep resistance even in amounts as low as 0.05%. Nickel additions as high as 0.06% or the use of 0.5% cadmium failed to effectively impart creep resistance.

In addition, as heretofore mentioned, numerous alloying elements so used presented a major processing problem.

Therefore, it is an object of this invention to provide an improved solder. It is another object of this invention to provide an improved solder exhibiting a high resistance to elongation under conditions of stress, without a sacrifice of other desirable solder characteristics.

A further object is to provide a solder particularly suitable for internally pressurized can bodies.

Yet another object is to provide a solder which can be used in mechanized soldering operations whereby solder conveying means are wetted by the solder.

Other objects will become apparent from the following description and appended claims.

Broadly, this invention contemplates a solder alloy comprising tin in amount from 1.0% to 3.0%, silver in amount from 0.25% to 0.75%, from 0.04% to 0.08% copper, from 0.035% to 0.055% tellurium and the balance substantially pure lead.

In accordance with the present invention we have discovered that a lead base solder alloy containing critical proportions of tin, copper, silver, and tellurium will exhibit exceptional resistance to strain (creep) due to stresses and exhibit the other necessary and desirable solder properties. Similarly, the novel solder of this invention overcomes the above mentioned processing difficulties associated with conventional solders.

The amount of tin in the novel solder alloy may range from 1.0% to 3.0% by weight of the alloy, higher amounts tending to produce cracking of the soldered seams. Amounts less than 1.0%, on the other hand, do not impart suitable capillary action of the solder to satisfactorily and thoroughly penetrate, for example, a double-lock can seam. In general, 2.5% tin is preferred.

It is preferred that silver be present in the alloy in amounts from at least 0.25%. In a solder containing less than 0.25% silver it was noted that during periods immediately subsequent to soldering, soldered pressurized can bodies exhibit a pronounced tendency to crack. Thus, such lower additions are to be avoided. Silver in amounts ranging up to 0.75% have produced the best results. Silver additions greater than 0.75% would render a solder unnecessarily expensive. For maximum benefits a silver content of 0.5% in the solder is preferred.

The addition of copper in its critical range together with the necessary amount of tellurium provide the solder alloy with increased resistance to creep. There are indications that there is a dependent inter-relationship between these elements with respect to creep resistance.

Copper and tellurium produce this desired characteristic when added in amounts of from 0.04% to 0.08% and 0.035% to 0.055% respectively, about 0.06% copper and about 0.045% tellurium being the preferred additions.

Copper in amount of 0.08% approaches the maximum amount of copper which can be soluble in the solder thereby precluding the addition of greater percentages. In the other direction, less than 0.04% copper does not permit the maximum desired benefits of the tellurium to be exhibited.

With respect to tellurium, less than 0.035% does not produce any significant creep resistance to the solder. Amounts greater than 0.055% tellurium are to be avoided since such amounts may impair the creep resistance of a solder, and could present dewetting conditions on solder conveying rollers.

The attainment of the beneficial effects of tellurium in the solder of this invention are particularly surprising since other group VIA elements, such as sulfur, oxygen and to a lesser extent, selenium, are the primary agents which cause dewetting of the solder conveying means in mechanized soldering operations.

The preparation of the solder alloy of this invention presents no difficulties. The solder composition may be compounded by the conventional methods known and used by those skilled in the art.

As the base metal, commercially pure soft lead or, if desired, "chemical" lead may be employed. The use of "chemical" lead can avoid further addition of the copper component for many formulations since such leads already contain about 0.06% copper and are substantially free of impurities. The amount of impurities in the base stock commercial grades of lead including "chemical lead" should be maintained below about 0.05% for best results.

Any conventional grade of the necessary alloying additives, i.e., silver, tellurium, tin and copper, may be used provided they are of reasonable purity.

In order to illustrate the substantial improvement achieved in adherence and creep strength of the solder of this invention, a number of solders, having various alloying ingredients in different relative proportions, were prepared and tested for elongation under various loads. These solders were tested as follows: Alloying elements were added to substantially pure, molten lead, cast into bars, then remelted and recast into individual specimen blanks. After trimming and machining, specimens were formed measuring 1/8" x 1" x 7½". All the test specimens were profiled to resemble standard tensile test specimens, such as are employed in A.S.T.M. tests, having a central portion of dimensions 1/8" x ¼" x 3" (the end portion of the specimens were wide but the gauge length region narrowed down to a ¼"). Gauge marks were made 2" apart in the 3" central portion, so that the elongation under load could be measured. The samples were suspended in duplicate from a rack. Hooks were inserted into holes drilled through reinforced ends of the samples which supported added weights. These weights were calculated to result in fiber stresses from 500 p.s.i. to 2,000 p.s.i. To reduce load variations caused by external vibrations, coiled springs were inserted between the weights and the test specimens. At periodic time intervals the elongation between gauge marks are measured. The tests were run at room temperature which varied from about 11° C. to about 25° C. over a period of 175 days. From the resulting datum, the elongation versus time for each load value on the specimens was obtained. Using this data, values showing the relative time required at each load level to reach 2% elongation and also to fail completely were obtained for each test alloy.

Representative data is incorporated in Table I, showing the results of 100 days on test. These tests are commensurate with currently accepted can testing procedures.

Table I

| A Solder No. | C Percent Tin | Percent Silver | Percent Copper | Percent Tellurium | Percent Other Metals | B P.s.i. |
|---|---|---|---|---|---|---|
| 1 | 2.5 | | | | | 740 |
| 2 | 2.5 | .5 | | | | 1,020 |
| 3 | 2.5 | .5 | .06 | | | 949 |
| 4 | 2.5 | .5 | .06 | .045 | | 1,250 |
| 5 | 2.5 | .25 | .06 | .045 | | 1,220 |
| 6 | 1.5 | .5 | .06 | .045 | | 1,160 |
| 7 | 1.5 | .5 | .06 | | .06 Nickel | 930 |
| 8 | 2.5 | .5 | .06 | | .06 Nickel | 1,000 |

NOTE A.—Balance of solder composed of substantially pure lead. B—Load, in pounds per square inch, to elongate 2% in 100 days. C—All percentages recited are percent by weight of the solder alloy.

Referring to Table I, and comparing alloys 2 and 3, when copper was added to a tin, silver, balance lead there was a reduction in the creep resistance as compared to a lead, silver solder. Separate previous tests on the addition of tellurium alone, showed no substantial improvement in creep resistance. The beneficial results of adding both copper and tellurium can be seen by the results of solders 3, 4 and 5.

Experimental field tests on pressurized cans maintained at internal gas pressures over 100 p.s.i. and stored at 110° F. were conducted for many months. The cans soldered with the solder alloy of this invention produced no failures. In contrast, similar cans soldered with conventional solders showed numerous failures due to cracks resulting from excessive elongation of solder in the can seams.

Laboratory tests, using a miniature solder conveying roller, were conducted to determine if the solder of this invention would cause dewetting. Conclusive results showed the roller to be wetted, even over extended periods of time.

The solders of this invention have also been employed in mechanized soldering production operations such as one alluded to previously. Millions of can bodies, such as aerosol cans, were successfully soldered. No difficulties in the utilization of the solder were encountered.

While this invention has been described by way of certain specific examples and with reference to certain preferred embodiments, these are illustrative only, and the invention is not construed as limited, except as set forth in the following claims.

We claim:
1. A solder alloy consisting essentially of, by weight percent, tin in amount from 1.0% to 3.0%, silver in amount from 0.25% to 0.75%, from 0.04% to 0.08% copper, from 0.035% to 0.055% tellurium and the balance commercially pure lead.

2. A solder alloy consisting essentially of, by weight percent, tin in amount about 2.5%, silver in amount about 0.5, copper in amount about 0.06%, tellurium in amount about 0.045% and the balance commercially pure lead, said solder characterized in that it is resistant to elongation under stress.

References Cited in the file of this patent

UNITED STATES PATENTS

| | | |
|---|---|---|
| 2,060,533 | Singleton et al. | Nov. 10, 1936 |
| 2,060,534 | Singleton et al. | Nov. 10, 1936 |
| 2,074,848 | Levy | Mar. 23, 1937 |
| 2,145,513 | Jones et al. | Jan. 31, 1939 |
| 2,588,095 | Eckel | Mar. 4, 1952 |